Aug. 2, 1966     J. J. REGIMBAL     3,264,189
POOL-TYPE NUCLEAR REACTOR WITH IMPROVED
LIQUID SHIELD ARRANGEMENT
Filed June 4, 1965
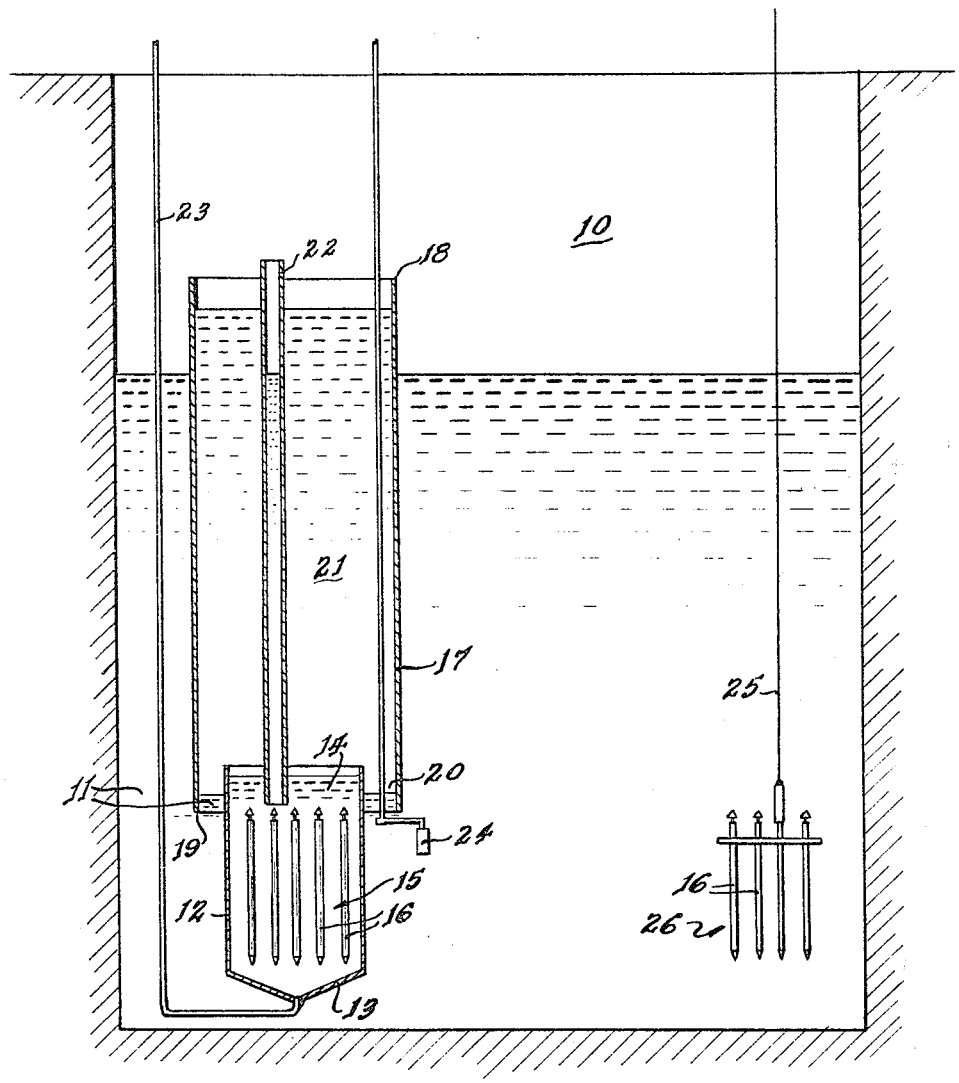
INVENTOR.
*James J. Regimbal*
BY
*Roland G. Anderson*
*Attorney*

3,264,189
POOL-TYPE NUCLEAR REACTOR WITH IMPROVED LIQUID SHIELD ARRANGEMENT
James J. Regimbal, Richland, Wash., assignor to the United States of America as represented by the United States Atomic Energy Commission
Filed June 4, 1965, Ser. No. 461,563
3 Claims. (Cl. 176—30)

The invention described herein was made in the course of, or under, a contract with the United States Atomic Energy Commission.

This invention relates to a nuclear reactor and more particularly to a heavy-water-moderated pool-type reactor.

In a pool-type or swimming-pool reactor the core of the reactor is disposed near the bottom of a large pool of ordinary water which constitutes the shield for the reactor. Swimming-pool reactors are very useful for general research and demonstration purposes because of their great flexibility and relatively low cost. One of the chief advantages of such a reactor is the ease of physical and visual access to the core and reflector components of the reactor through the shielding water over the core. This top shield also serves as an additional heat capacitor and convection zone for energy released by thermally hot test fuels as they are being transferred.

A pool design has not heretofore been utilized for a reactor incorporating high-purity heavy water as moderator due to the prohibitive cost of a heavy water shield. However, use of heavy water as moderator would roughly double the available thermal neutron flux for a given power over that attainable in a similar reactor incorporating a light water moderator and in addition reduce the critical mass.

It is accordingly the object of the present invention to develop a reactor of the swimming-pool type incorporating a heavy water moderator.

This and other objects of the present invention are attained by employing an upper hydrocarbon shield which is immiscible in water to isolate the heavy water of the moderator from the light water of the pool. Specifically, a cylindrical baffle is provided which extends from a point above the top of the hydrocarbon shield to a point just below the top of the reactor tank. The baffle has a greater diameter than the reactor tank and surrounds the top of the reactor tank. Means are also provided for discharging fuel assemblies from the reactor core into the pool of light water surrounding the reactor core and for providing access to the reactor core without exposure to the liquid in the top shield.

The invention will next be described in connection with the accompanying drawing wherein the single figure is a diagrammatic vertical cross section through a nuclear contructed in accordance with the present invention.

Referring now to the drawing, a reactor compartment 10 contains a pool 11 of ordinary water. An open-top reactor tank 12 having a conical bottom 13 and containing a body of heavy water moderator 14 is submerged at one side of pool 11 near the bottom thereof. Nuclear reactor core 15 consisting of a plurality of vertically disposed fuel assemblies 16 is located in reactor tank 12. Conventional control elements (not shown) are employed to control the reactor. An elongated vertically disposed cylindrical baffle 17 is disposed in pool 11 with its top edge 18 well above the top of the pool and with its bottom edge 19 below the top of reactor tank 12, surrounding tank 12 and spaced therefrom to form an annular space 20. A liquid hydrocarbon such as kerosene fills baffle 17 and floats on the heavy water moderator 14 in tank 12 to serve as a top shield 21. The hydrocarbon also serves as a barrier to isolate the heavy water 14 in the tank 12 from the ordinary water forming pool 11 since the hydrocarbon fills the top portion of the annulus 20 between tank 12 and baffle 17. Thus it is not possible for the heavy water and light water to mix.

A core access tube 22, which contains heavy water, extends from a point above hydrocarbon shield 21 through the shield into the heavy water in tank 12. This may be used to lower nonradioactive elements and monitoring equipment into the reactor. This is useful in cases where a possible thin oil film on equipment is undesirable. After inserting the tube the hydrocarbon filling the tube is drawn off at the top, permitting heavy water to fill the tube. The tube is sealed when not in use. A heavy water fill line 23 communicates with the apex of the conical bottom 13 of reactor tank 12. Crank-shaped transfer tool 24 is provided to raise fuel assemblies 16 from the core 15, lower them through annulus 20 and pass them under the bottom edge 19 of baffle 17. Fuel hangers 25 carry them over to fuel storage area 26.

The facility is assembled as follows:

Reactor tank 12 is lowered into place near the bottom of pool 11. Baffle 17 is put into place, the upper portion of its walls protruding above the level of the pool 11 about five feet. The lower end of baffle 17 surrounds reactor tank 12, the walls of the two having a suitable vertical overlap. Baffle 17 is then filled with a liquid hydrocarbon from the top, this action forcing water out of the baffle through annular space 20 at the overlap. The water-hydrocarbon interface is depressed to a point below the top of reactor tank 12 but above the bottom of baffle 17 in annular space 20. At this time the water still filling reactor tank 12 is completely removed by pumping. This action depresses the water-hydrocarbon interface in the reactor tank until the tank is filled to the bottom with only hydrocarbon liquid. (Pumping can be continued until hydrocarbon approaches the pump inlet.) The annular interface remains practically static if the same mass flow rate of hydrocarbon is supplied as makeup into the shield volume. Heavy water moderator may now be introduced by pumping into the bottom of the reactor tank until the circular heavy water-hydrocarbon interface is at a desired level inside the reactor tank. The hydrocarbon makeup procedure is reversed during this time to keep the annular interface static.

Fuel handling procedures are similar to those employed in ordinary swimming-pool reactors except as it is necessary to modify them because of the presence of baffle 17. To transfer a fuel assembly 16 from storage area 26 to the core 15, the assembly, still attached to its hanger 25, is transferred to a position about as near the outside of baffle 17 as the hanger will permit. Grappling tool 24 is then lowered inside baffle 17, its grasping end descending through annulus 20. The grappling tool is rotated so that the crank-shaped end thereof extends out into pool 11 under the bottom edge 19 of baffle 17. The tool is then fastened to the fuel assembly 16 and the original hanger is removed. The element is passed under baffle 17, raised above the core and then lowered into the core.

The hydrocarbon used should be one which is optically transparent, does not tend to color with age, has an index of refraction near that of water, floats on heavy water, is relatively odorless, and has a high flash point. Ordinary kerosene, which consists predominantly of the paraffin series from decane to pentadecane, is satisfactory. Kerosene, of course, is very cheap and even the very pure alkanes are not prohibitively expensive, costing no more than about 30 cents a pound.

It will be understood that the invention is not to be limited to the details given herein but that it may be modified within the scope of the appended claims.

The embodiments of the invention in which an exclusive property or privilege is claimed are defined as follows:

1. A nuclear reactor comprising a compartment containing a pool of light water, an open-top tank containing heavy water submerged in said pool of light water, a nuclear reactor core consisting of a plurality of vertically disposed fuel assemblies disposed in said open-top tank, and a cylindrical baffle containing a hydrocarbon liquid as top shield having a greater diameter than the open-top tank and being vertically disposed in the pool of water with its top above the top of the pool of water and its bottom surrounding and overlapping the open-top tank.

2. A nuclear reactor according to claim 1 and including means for loading and unloading fuel assemblies including a fueling tool extending to a point above the upper shield and possessing a crank-shaped lower portion capable of transferring a fuel element from the reactor core to the pool of water outside of the reactor tank.

3. A nuclear reactor according to claim 2 and including an access tube which is filled with heavy water leading from the reactor core to above the top shield.

References Cited by the Examiner
UNITED STATES PATENTS

| | | | |
|---|---|---|---|
| 2,873,243 | 2/1959 | Wigner et al. | 176—64 |
| 2,877,171 | 3/1959 | Burton et al. | 176—64 |

L. DEWAYNE RUTLEDGE, *Primary Examiner.*